United States Patent [19]

Katagiri et al.

[11] 4,130,189

[45] Dec. 19, 1978

[54] RETURN SPRING OF A DRUM BRAKE USED IN A VEHICLE

[75] Inventors: Masayoshi Katagiri; Ziro Kizaki, both of Toyota, Japan

[73] Assignee: Toyota Jidosha Kogyo Kabushiki Kaisha, Aichi, Japan

[21] Appl. No.: 842,159

[22] Filed: Oct. 14, 1977

[30] Foreign Application Priority Data

Jun. 13, 1977 [JP] Japan ................................ 52-69652

[51] Int. Cl.² ............................................. F16D 51/24
[52] U.S. Cl. .................................... 188/328; 188/216
[58] Field of Search ............... 188/216, 325, 326, 327, 188/328, 329, 330, 331, 332, 333, 334, 335, 205 A; 267/158, 164

[56] References Cited

U.S. PATENT DOCUMENTS

| 2,385,540 | 9/1945 | Rasmussen | 188/216 |
| 2,671,535 | 3/1954 | House | 188/326 |
| 2,945,564 | 7/1960 | House et al. | 188/328 |
| 3,095,950 | 7/1963 | Scheel | 188/216 |
| 3,203,512 | 8/1965 | Lepelletier | 188/216 |

*Primary Examiner*—Edward R. Kazenske
*Attorney, Agent, or Firm*—Browdy and Neimark

[57] ABSTRACT

A drum brake used in a vehicle generally includes a backing plate secured to a non-rotatable member of a wheel shaft; a pair of brake shoes slidably attached to the backing plate; a wheel cylinder disposed between each end portion of the brake shoes where they are closely positioned to each other; and a substantially U-shaped return spring to be engaged with each web portion of the brake shoes at the extreme ends thereof for biasing both in a mutually approaching direction. The U-shaped return spring in this invention is characteristically provided with, at each end portion thereof, where the same is engaged with each web portion of the shoes, a notch whereinto the web portion is to be fitted for securely positioning the return spring.

3 Claims, 8 Drawing Figures

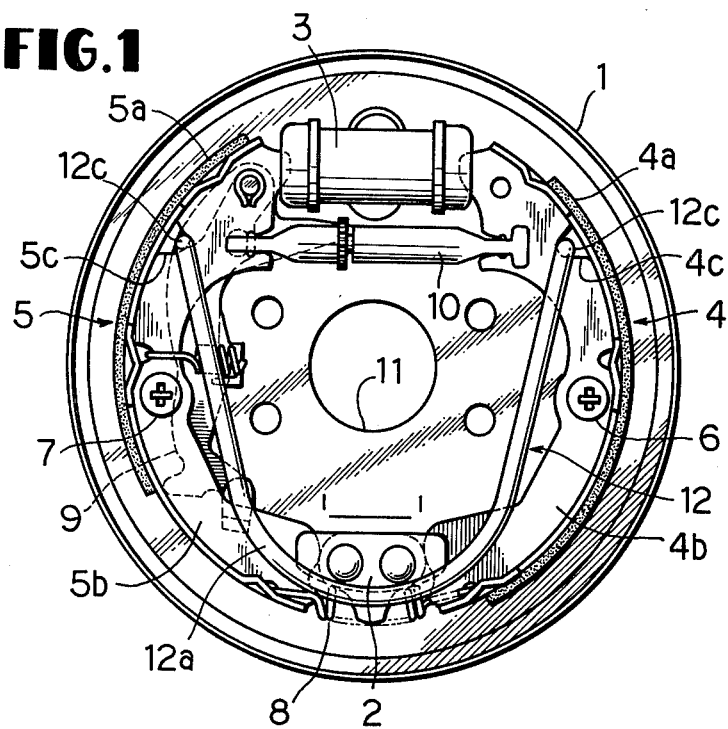
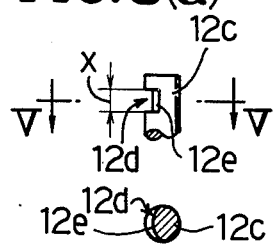
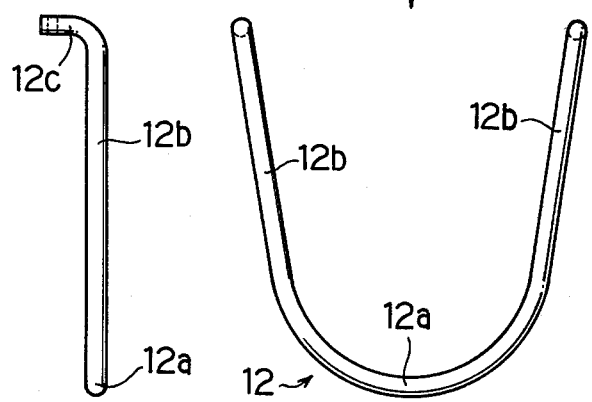
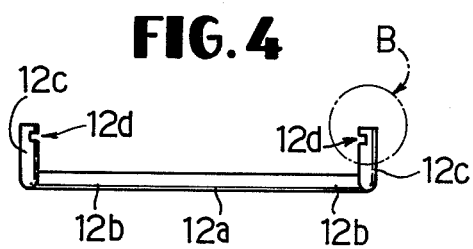
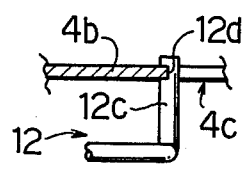
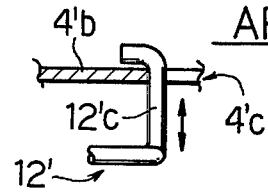

RETURN SPRING OF A DRUM BRAKE USED IN A VEHICLE

BACKGROUND OF THE INVENTION

This invention relates to an improvement of the drum brake for use in an automotive vehicle. More particularly, it is aimed at improving the construction of a substantially U-shaped return spring, which is disposed between a pair of brake shoes (hereinafter simply called shoes); the spring draws the shoes toward one another in a drum brake for vehicle use, thereby preventing the shoes from interfering with the backing plate, the parking lever, or other component of the brake, by means of a definite positioning of the return spring after the same has been mounted on the shoe.

In a drum brake the braking function is carried out by making a pair of shoes slidingly contact a rotating drum which rotates with a wheel. Each shoe is made of a crescent-shaped member with a lining thereon. A wheel cylinder, disposed between the extreme end portions of the pair of shoes, actuates the contact between the shoe and the drum. It is necessary that the shoe, which has been slidingly urged on the drum, be retracted therefrom rapidly and positively as soon as the actuating force on the shoe disappears. For attaining this object a return spring is tensed and anchored between the pair of shoes, whereby the latter are biased, by means of elasticity of the return spring, in a withdrawing direction from the contacting surface of the drum, i.e., in a mutually approaching direction. As a return spring for this purpose a coil spring or a substantially U-shaped spring made of a rigid wire rod is generally used. In case of small sized drum brakes, however, a U-shaped return spring is preferable to a coil spring, because of the former's considerably freer choice of positioning without being interfered with or being affected by other brake component members.

In such a conventional U-shaped return spring, each L-shaped end portion thereof is engaged with a respective engaging hole which is formed on either shoe web. The extreme end of both bent portions are bent or curved in a hook-like manner, still further, for preventing the bent portion, which has been engaged with the engaging hole, from slipping out of the hole.

Such a construction of the bent portion with a hook-like curved end is solely aimed at preventing the spring from slipping out of the engaging hole, and no regard is paid to the problem of whether the bent portion comes into the engaging hole of the shoe web so deeply as to protrude too great a distance toward the backing plate side, when some kind of urging force is actuated on the return spring. This phenomenon could cause the protruding portion of the return spring, to interfere with the backing plate and/or the parking lever, thereby producing an inferior braking effect because of an undesirable sliding of the shoe or a deteriorated operation of the parking lever.

A similarly constructed U-shaped return spring to the above, disclosed in U.S. Pat. No. 3,441,109, is also one on which the end portions thereof are bent, with the object of engaging the curved portion, formed by bending, directly with the engaging hole of the web. It still contains various knotty problems such as:

(1) Because of technical difficulty in forming a curved portion with a small radius of curvature at the furthest end of the spring a surplus length of wire remains, on each extreme end portion of the spring. This surplus length of wire must be cut after the bending process has been finished. The choice of the cut position is not an easy matter, because the cut position must be as close as possible to the curved portion in order to minimize the likelihood that the curved portion will protrude from the engaging hole toward the backing plate side, thereby preventing the same from interfering with other brake component members, such as the backing plate. The cut position must also be as far as possible from the curved portion with a sufficient allowance left for securing the engagement of the bent portion with the engaging hole.

(2) A further serious problem is the likelihood that a crack or cracks will appear on the outer side of the curved portion during the bending process, which portion is required to be a hook-like portion with a small radius of curvature for securely engaging with the hole. Such a crack or cracks must be absolutely avoided for fear of damaging the spring.

(3) The problem of minimizing the cost of cutting off a piece of material from the spring end is not a negligible one.

SUMMARY OF THE INVENTION

It is therefore a primary object of this invention to provide against such a background, an improved return spring of a drum brake for vehicle use.

It is another object of this invention to provide an improved construction of a U-shaped return spring, anchored between a pair of shoe webs, for definitely or exactly positioning the same, so as not to interfere with other brake component members, such as the backing plate, and the parking lever.

It is a still further object of this invention to provide an improved and simplified construction of a return spring, for making secure the engagement of the return spring with the shoe web.

Other objects and advantages of this invention will be apparent from the study of the following description of a preferred embodiment in conjunction with the accompanying drawings:

The substantially U-shaped return spring in accordance with this invention, used in a drum brake, includes (1) a backing plate secured to a non-rotating member of the wheel shaft;

(2) a pair of brake shoes slidably attached to the backing plate;

(3) a wheel cylinder mounted between mutually closely positioned ends of the brake shoes; and (4) a substantially U-shaped return spring which is engaged with the web portion of each shoe, at either end thereof, for biasing both shoes in a mutually approaching direction, the return spring being characteristically provided with a notch at the portion where it engages with the web portion of the shoe for being surely fitted thereinto by the web portion.

BRIEF DESCRIPTION OF THE DRAWINGS

FIG. 1 is an elevation of an embodiment of this invention;

FIG. 2 is a plan view of a U-shaped return spring in accordance with this invention;

FIG. 3 is a left side view of a U-shaped return spring in accordance with this invention;

FIG. 4 is a projection view seen from A of FIG. 2;

FIG. 5(a) is an enlarged view of the portion shown at "B" in FIG. 4;

FIG. 5(b) is a cross-sectional view of FIG. 5(a) taken along the line V—V;

FIG. 6 is a fractional explanatory view illustrating a mounted condition of the invented U-shaped return spring on the shoe web; and FIG. 7 is a view similar to FIG. 6; but of a conventional prior art U-shaped return spring, shown for comparison only.

DETAILED DESCRIPTION OF A PREFERRED EMBODIMENT

In FIG. 1 a backing plate 1 is secured to a non-rotating member of a wheel shaft so that it confronts an opening of a brake drum (not shown) which rotates with the wheel shaft. On the backing plate 1 are secured an anchor 2 and a wheel cylinder 3. A pair of crescent-shaped shoes 4, 5 of a leading and trailing shoe type brake, are each composed of a lining 4a (5a) and a shoe web 4b (5b). Each shoe 4 (5) is slidably mounted on the backing plate 1 respectively with a shoe hold down spring assembly 6 (7), and abuts an anchor 2 at one mutually closely positioned end portion therof. Being so constructed, the pair of shoes 4 and 5 are both moved, due to the actuation of the wheel cylinder 3, in such a direction as to slidingly contact the brake drum, i.e., in a mutually separating direction (in the left and rightward direction respectively in FIG. 1). In addition, reference numerals 8, 9, 10 and 11 designate respectively an anchor spring, a parking lever, a strut, and a hole for accommodating the inserted wheel shaft.

The U-shaped return spring 12 is, near both ends thereof provided with bent engaging portions 12c, engaged with respective engaging holes 4c and 5c, located in a portion of the webs 4b and 5b of the shoes 4 and 5 near the wheel cylinder 3. The curved or loop portion 12a of the U-shaped return spring 12 is, as shown in FIG. 1, located near the anchor 2, for biasing the shoes 4 and 5 in a mutually approaching direction.

The U-shaped return spring 12 comprises the central curved or loop portion 12a and a pair of straight line portions 12b, as shown in detail in FIGS. 2 to 6, which together form a U-shape. Both end portions 12c of the spring are bent (approximately parallel) in the same direction (approximately perpendicular to the plane formed by the letter U) to form the engaging portions 12c, on each side, for respective engagement with engaging holes 4c and 5c. The engaging portions 12c are provided with a respective notch or a groove 12d having plane walls extending from the bottom thereof, in such a position that the notches face one another towards the inside of the U letter. The respective shoe webs 4b, 5b fit into the respective notches 12d, so it is preferable that the width X of the notch 12d be approximately identical to or a little larger than the thickness of the web 4b (5b), for receiving the latter thereinto. Moreover, the notched surface, particularly the bottom portion of the notches, should preferably be formed so as to coincide or mate with the engaging surfaces of the engaging holes 4c and 5c of the shoe webs 4b and 5b; in this embodiment the engaging surface of the engaging hole 4c and 5c is circular, and the bottom of the notch is consequently in the form of circular arc (see FIG. 5(a) and 5(b)).

The U-shaped return spring 12 of this invention, as shown in FIG. 6, is secured to the shoe web 4b, as well as web 5b (not shown in FIG. 6) at a certain fixed position without interfering with other brake component members, such as backing plate 1 and the parking lever 9, owing to the absence of displacement of the engaging portion 12c of the return spring 12, which naturally leads to a normal braking operation.

The superiority of the present invention can be clearly understood by comparing the same with a conventional U-shaped one 12', in which the furthest end is curved like a hook for preventing the same from slipping out of the engaging hole. In the latter, the engaging portion 12'c, as shown in FIG. 7, is liable to project, when any kind of urging force is applied thereon, or to move freely in the directions marked by arrows, especially upward in the same Figure, thus interfering with the backing plate or other brake component members.

In this invention the notch can be easily formed by a suitable process in very close proximity to the extremity of the spring 12, and various problems accompanying the earlier cited U.S. Pat. No. 3,441,109, such as the difficulty in forming the bent portion, the difficulty of cutting off the surplus portion, and the loss of material due to the cutting off, can be entirely eliminated. The abovementioned interference of the surplus portion with the backing plate and other brake components will not occur in this invention. Another important advantage of the present invention is that the length of the engaging portion 12c of the return spring 12 may be shorter than that of the conventional one, which results in decreasing the weight of the spring, thereby contributing to the weight decrease of vehicles.

In addition, the formation of the notch may be easily executed by cold-forging or some other method during the bending process of the spring material (before heat treatment). Although the above cold-forging method is the most preferable one for the notch forming in the present invention, from the standpoint of the strength feature of the same, many other methods may be of course be used. Forming the notch by some machining operations, after the spring has been finished into its expected configuration, is also permissible.

The substantially U-shaped return spring of this invention, which is engaged at each end portion thereof with the web portion of either shoe to bias both shoes in a mutually approaching direction, is characterized in that the same is provided on each end portion with a notch to engage with the web portion of the shoe for securing the return spring at a certain fixed position, with the result of perfectly preventing the same from interfering with the backing plate or some other brake component members, as well as of definitely locating the same. It can be said that this invention has characteristically solved many knotty problems which have accompanied the conventional U-shaped return spring, by adopting a simple but ingenious construction.

The description stated in greater detail for the above embodiment is of course to clarify the technical concept of this invention, which should by no means be construed as limiting the scope of the invention. Various modifications and changes may be executed by those skilled in the art without departing from the spirit of this invention stated in the following claims.

What is claimed is:

1. In a drum brake for vehicle use which includes:
   a backing plate secured to a fixedly positioned member on a wheel shaft;
   a pair of brake shoes slidably attached to said backing plate, each of said brake shoes including a lining portion and a web portion, each web portion including a hole;

a wheel cylinder disposed between respective first mutually closely positioned end portions of said shoes;

an anchor means doposed between second mutually closely positioned end portions of said shoes;

a substantially U-shaped return spring which includes a U-shaped portion in a given plane and is engaged with each web portion of said shoes for biasing said shoes in a mutually approaching direction;

the improvement wherein said U-shaped return spring is made of a wire rod, each end portion of said rod being bent perpendicularly to said plane determined by said U-shaped portion of said U-shaped return spring, into respective L-shapes for providing respective engaging portions engaged with respective ones of said holes in said web portions of said shoes, each of said engaging portions being provided with a respective notch, which is a single indent having shoulders on either side thereof, formed substantially perpendicular to an axis of said engaging portion in a mutually confronting posture and fitted respectively onto an edge of a respective one of said engaging holes to prevent relative movement of said engaging portions in the axial direction relative to said web portions due to abutment of said web portions on said shoulders, with said U-shaped portion of said U-shaped return spring being spaced from said web portions.

2. An improved drum brake in accordance with claim 1, wherein each of said notches is formed so close to extreme ends of said engaging portions of L-shaped of said return spring so that the length of said shoulders beyond said notch in the direction of said backing plate is shorter than the distance between said web portions and said backing plate, whereby said return spring does not contact said backing plate.

3. An improved drum brake in accordance with claim 1, wherein said notches are made by cold-forging.

* * * * *